(12) United States Patent
Zhang et al.

(10) Patent No.: US 11,138,075 B2
(45) Date of Patent: Oct. 5, 2021

(54) METHOD, APPARATUS, AND COMPUTER PROGRAM PRODUCT FOR GENERATING SEARCHABLE INDEX FOR A BACKUP OF A VIRTUAL MACHINE

(71) Applicant: EMC IP Holding Company LLC, Hopkinton, MA (US)

(72) Inventors: Ming Zhang, Shanghai (CN); Lihui Su, Shanghai (CN); Yubing Zhang, Shanghai (CN); Zak Liang, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 260 days.

(21) Appl. No.: 16/288,068

(22) Filed: Feb. 27, 2019

(65) Prior Publication Data

US 2020/0133792 A1 Apr. 30, 2020

(30) Foreign Application Priority Data

Oct. 24, 2018 (CN) .......................... 201811246723.4

(51) Int. Cl.
 *G06F 9/455* (2018.01)
 *G06F 11/14* (2006.01)
 (Continued)

(52) U.S. Cl.
 CPC ...... *G06F 11/1464* (2013.01); *G06F 9/45558* (2013.01); *G06F 16/148* (2019.01);
 (Continued)

(58) Field of Classification Search
 None
 See application file for complete search history.

(56) References Cited

U.S. PATENT DOCUMENTS 8,577,845 B2 * 11/2013 Nguyen ............... G06F 11/1451
 707/654
8,751,515 B1 * 6/2014 Xing ..................... G06F 16/113
 707/755

(Continued)

OTHER PUBLICATIONS

Kaur et al. "Secure VM Backup and Vulnerability Removal in Infrastructure Clouds", 2014 IEEE, pp. 1217-1226.*

(Continued)

*Primary Examiner* — Van H Nguyen
(74) *Attorney, Agent, or Firm* — Womble Bond Dickinson (US) LLP

(57) ABSTRACT

The present disclosure relates to a method, apparatus and computer program product for managing a virtual machine. According to example implementations of the present disclosure, there is provided a method for managing a virtual machine. In the method, in response to receiving a backup request for the virtual machine, corresponding metadata of a corresponding object of at least one object in the virtual machine is obtained, the corresponding metadata describing multiple attributes of the corresponding object in a file system of the virtual machine. A corresponding abstract describing a basic attribute of multiple attributes of the corresponding object is generated on the basis of the corresponding metadata. An index of a backup version of the virtual machine is created on the basis of the corresponding abstract, the index comprising a corresponding path of the corresponding object in the backup version of the virtual machine. Moreover, there is provided an apparatus and computer program product for managing a virtual machine.

21 Claims, 7 Drawing Sheets

(51) Int. Cl.
    *G06F 16/14*     (2019.01)
    *G06F 16/185*     (2019.01)

(52) U.S. Cl.
    CPC .. *G06F 16/185* (2019.01); *G06F 2009/45583* (2013.01); *G06F 2009/45595* (2013.01); *G06F 2201/815* (2013.01)

(56) References Cited

U.S. PATENT DOCUMENTS

| | | | |
|---|---|---|---|
| 9,628,561 B1* | 4/2017 | Kulkarni | G06F 11/1464 |
| 9,697,228 B2* | 7/2017 | Subramanian | G06F 11/1435 |
| 9,939,981 B2* | 4/2018 | Varadharajan | G06F 11/1446 |
| 9,996,425 B2* | 6/2018 | Shulga | G06F 9/45558 |
| 10,067,692 B2* | 9/2018 | Liu | G06F 9/45558 |
| 2015/0074060 A1* | 3/2015 | Varadharajan | G06F 3/04842 |
| | | | 707/649 |
| 2015/0293817 A1* | 10/2015 | Subramanian | G06F 11/1448 |
| | | | 707/645 |

OTHER PUBLICATIONS

Wang et al. "A Remote Backup Approach for Virtual Machine Images", 2016 IEEE, pp. 252-255.*

* cited by examiner

```
"dp_entity_id": {
  "type": "keyword",
  "store": true
},
"dp_entity_target": {
  "type": "keyword",
  "store": true
},
"dp_plugin_id": {
  "type": "keyword",
  "store": true
},
"xvsource": {
  "type": "text",
  "store": true,
  "fields": {
    "raw": {
      "type": "keyword"
    }
  },
  "analyzer": "analyzer_keyword"
},
"xvdate": {
  "type": "date",
  "store": true
},
"xvlocation": {
  "type": "text",
  "store": true,
  "term_vector": "with_positions_offsets",
  "fields": {
    "path": {
      "type": "text",
      "analyzer": "analyzer_path"
    },
    "raw": {
      "type": "keyword"
    }
  }
},
"xvsize": {
  "type": "long",
  "store": true
}
```

FIG. 4

METHOD, APPARATUS, AND COMPUTER PROGRAM PRODUCT FOR GENERATING SEARCHABLE INDEX FOR A BACKUP OF A VIRTUAL MACHINE

CROSS-REFERENCE TO RELATED APPLICATION

This patent application claims priority, under 35 U.S.C. § 119, of Chinese Patent Application No. 201811246723.4, filed Oct. 24, 2018, entitled "METHOD, APPARATUS, AND COMPUTER PROGRAM PRODUCT FOR MANAGING VIRTUAL MACHINE."

FIELD

Various implementations of the present disclosure generally relate to virtual machines, and more specifically, to a method, apparatus and computer program product for performing a backup operation to a virtual machine.

BACKGROUND

With the development of computer technology, virtual machine technology has been widely applied to various industries. By virtue of factors such as convenient centralized management and price advantage, more and more users use virtual machine technology to implement their application systems. During the running of application systems, usually data in application systems need to be backed up, so that application systems may be restored with backup data when failures occurs in application systems or on the basis of other data restoration requirement.

In order to restore a certain object (e.g., file or file folder) in a virtual machine-based application system to a version of an object in backup data, a user has to perform complex operations to find the desired object in backup data. At this point, it is a research hotspot on how to perform a virtual machine backup operation and subsequent query and restoration operations in a more convenient and efficient way.

SUMMARY

Therefore, it is desirable to develop and implement a technical solution for managing a virtual machine more effectively. It is desired that the technical solution can be compatible with existing application environments and manage the virtual machine more effectively by reconstructing various configurations of existing application environments.

According to a first aspect of the present disclosure, there is provided a method for managing a virtual machine. In the method, in response to receiving a backup request for the virtual machine, corresponding metadata of a corresponding object of at least one object in the virtual machine is obtained, and the corresponding metadata describes multiple attributes of the corresponding object in a file system of the virtual machine. A corresponding abstract describing a basic attribute of multiple attributes of the corresponding object is generated on the basis of the corresponding metadata. An index of a backup version of the virtual machine is created on the basis of the corresponding abstract, and the index comprises a corresponding path of the corresponding object in the backup version of the virtual machine.

According to a second aspect of the present disclosure, there is provided an apparatus for managing a virtual machine. The apparatus comprises: at least one processor; a volatile memory; and a memory coupled to the at least one processor, the memory having instructions stored thereon, the instructions, when executed by the at least one processor, causing the apparatus to perform acts. The acts include: in response to receiving a backup request for the virtual machine, obtaining corresponding metadata of a corresponding object of at least one object in the virtual machine, the corresponding metadata describing multiple attributes of the corresponding object in a file system of the virtual machine; generating a corresponding abstract describing a basic attribute of multiple attributes of the corresponding object on the basis of the corresponding metadata; and creating an index of a backup version of the virtual machine on the basis of the corresponding abstract, the index comprising a corresponding path of the corresponding object in the backup version of the virtual machine.

According to a third aspect of the present disclosure, there is provided a computer program product. The computer program product is tangibly stored on a non-transient computer readable medium and comprises machine executable instructions which are used to implement a method according to the first aspect of the present disclosure.

BRIEF DESCRIPTION OF THE DRAWINGS

Through the more detailed description in the accompanying drawings, features, advantages and other aspects of the implementations of the present disclosure will become more apparent. Several implementations of the present disclosure are illustrated schematically and are not intended to limit the present invention. In the drawings:

FIG. 4 schematically illustrates a block diagram of code for defining an abstract according to implementations of the present disclosure;

DETAILED DESCRIPTION OF IMPLEMENTATIONS

The preferred implementations of the present disclosure will be described in more details with reference to the drawings. Although the drawings illustrate the preferred implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can comprise other explicit and implicit definitions.

Figure 1:
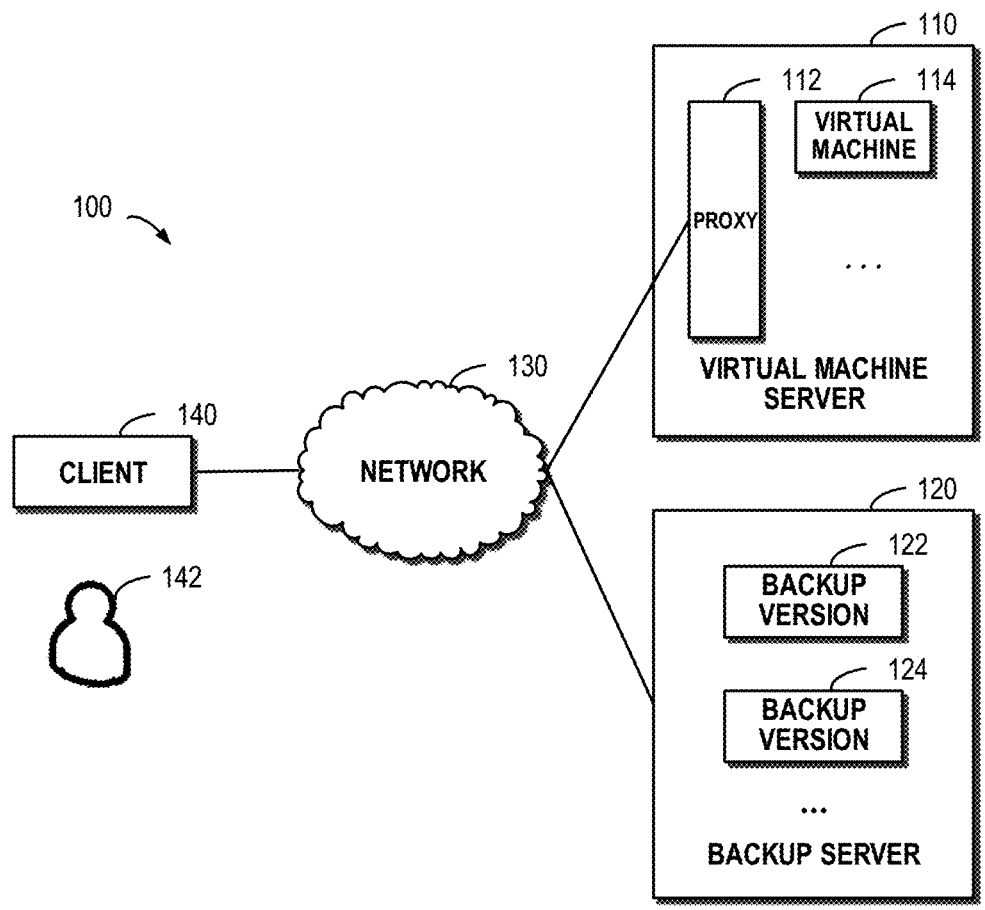
FIG. 1 schematically illustrates a block diagram of an application environment in which implementations of the present disclosure may be applied.

FIG. 1 schematically shows a block diagram of an application environment 100 in which implementations of the present disclosure may be applied. As depicted, a virtual machine server 110 may provide one or more virtual machines 114, so that a user 142 may use, at a client 140, various functions provided by the virtual machine 114. A proxy 112 in the virtual machine server 110 may act as an agent of communication between the client 140 and the virtual machine 114 and may be used to transmit data between them. At this point, the user 142 may communicate with the agent 112 through a network 130 via the client 140 locally located at the user 142.

It will be understood although FIG. 1 merely illustrates the circumstance in which the virtual machine server 110 comprises one virtual machine 114, while the virtual machine server 110 may further comprise more virtual machines. At this point, various virtual machines may have the same or different configuration so as to provide service to multiple users. It will be understood although FIG. 1 illustrates only one virtual machine server 110, there may exist multiple virtual machine servers. Further, each of multiple virtual machine servers may comprise one or more virtual machines. It will be understood although FIG. 1 illustrates the circumstance in which the virtual machine server comprises the proxy 112, and the functionality of the proxy 112 may be affected by a separate device. Alternatively and/or additionally, the proxy 112 may communicate with multiple virtual machines in multiple virtual machine servers so as to act as an agent between the multiple virtual machines and clients of corresponding users.

Further, FIG. 1 shows a backup server 120, and the backup server 120 comprises backups 122, 124, etc. Here, the backup versions 122 and 124 may be backups which are generated for the virtual machine 114 at different time points, or the backup versions 122 and 124 may further be backups for different virtual machines.

With the development of virtual machine technology, technical solutions have been proposed to perform backup operations to the virtual machine 114 under a predetermined backup policy. The user 142 may generate different backup versions 122 and 124 of the virtual machine 114 at different time points. Suppose a file system of the virtual machine 114 comprises a file test, and the user 142 generates the backup versions 122 and 124 at time points 1 and 2. When the user 142 wants to query which versions of the file test exist in the whole running process of the virtual machine 114, the user has to first search in the current virtual machine, then perform complex restoration operations to restore all files in backup versions 1 and 2, and further search in restored files so as to find corresponding backup versions of the file test.

As objects comprised in the virtual machine and backup versions increase, when querying a certain file, the user has to spend a lot of time for restoring files in backup versions. It will be understood the backup versions 122 and 124 may further be encrypted versions and/or compressed versions of the virtual machine 114, at which point a decryption and/or decompression step needs to be performed during restoration. This leads to higher computing overhead and time overhead. At this point, it is a research hotspot on how to manage the virtual machine more simply and effectively.

Figure 2:
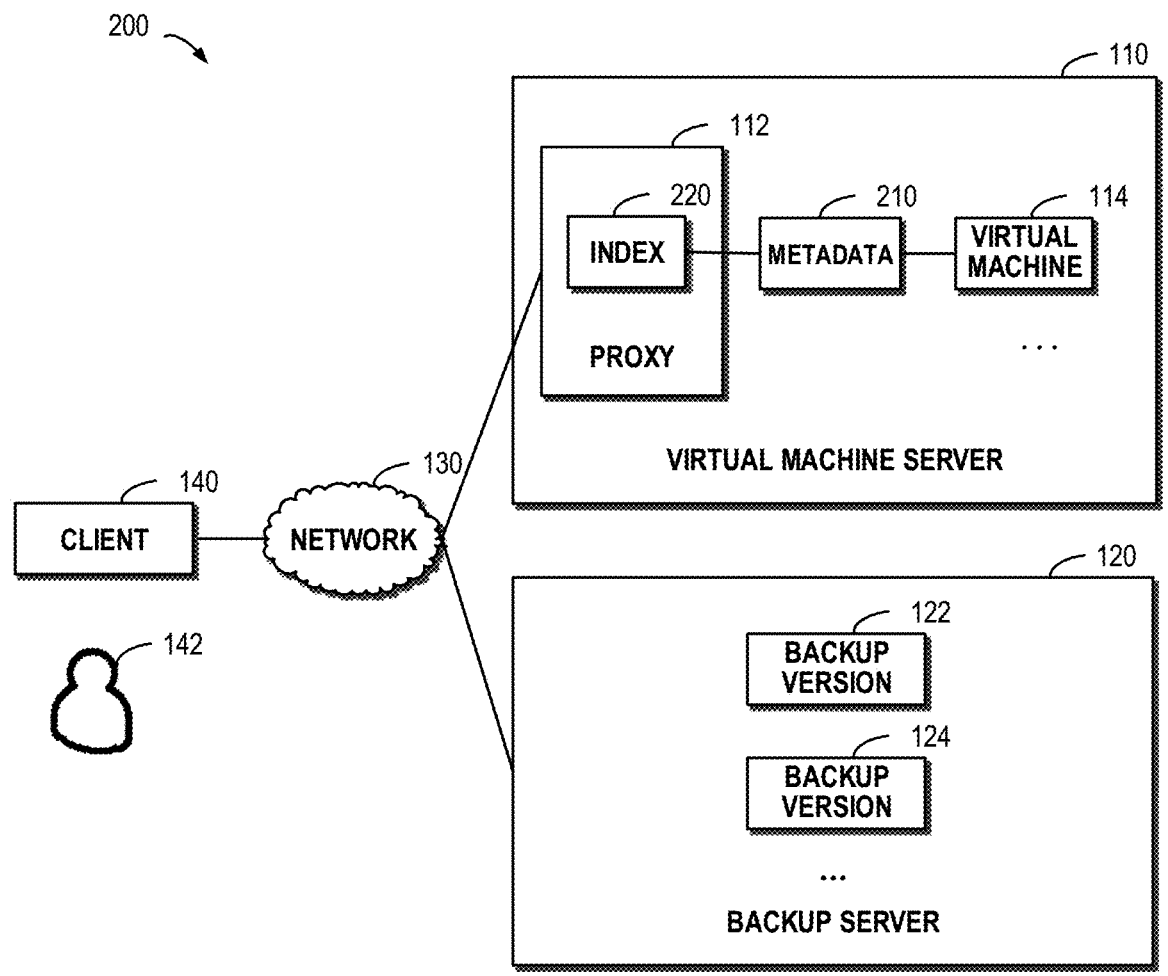
FIG. 2 schematically illustrates a block diagram for managing a virtual machine according to implementations of the present disclosure.

To at least partly solve problems in the prior art, according to example implementations of the present disclosure, there is proposed a method, apparatus and computer program product for managing a virtual machine. With reference to FIG. 2, general description is presented to example implementations of the present disclosure. FIG. 2 schematically shows a block diagram 200 for managing a virtual machine according to implementations of the present disclosure. As depicted, according to example implementations of the present disclosure, after a backup request for performing a backup operation to the virtual machine 114 is received, first corresponding metadata 210 of a corresponding object of at least one object in the virtual machine may be obtained. It will be understood each object may have metadata 210, and the metadata 210 are used to describe multiple attributes of the object in a file system of the virtual machine. It will be understood here there may exist one or more attributes, including a position of the object in the virtual machine 114, a size of the object, modification time, etc.

An abstract of the at least one object may be generated on the basis of metadata of each object of the at least one object. Here the abstract may comprise a basic attribute of each object so as to build an index 220. Subsequently, the index 220 may be generated as shown in FIG. 2, which may comprise a corresponding path of the at least one object in a backup version of the virtual machine 114.

By means of the above example implementations, the index 220 of the backup version 122 of the virtual machine 114 may be generated in advance. Here the index 220 may comprise a path of the at least one object in the virtual machine 114 in the backup version 122. In this way, when there is a need to query whether the backup version 122 of the virtual machine 114 comprises a target object or not, it may be directly queried in the index 220 whether an identifier of the target object is comprised or not. Here the target object refers to an object which is desired to be queried. If the query result is "yes," then the desired object in the backup version 122 may be accessed directly on the basis of a path corresponding to the identifier. In this way, the backup and subsequent query operation of the virtual machine 114 may be managed more simply and effectively.

It will be understood although FIG. 2 merely illustrates the circumstance in which the index 220 is generated for one virtual machine 114, while the method may further be used to generate corresponding indexes for multiple virtual machines. Further, the method may further be used to generate corresponding indexes for different backup versions of the virtual machine 114 which are generated at different time points. During the operation of the virtual machine 114, objects in the virtual machine 114 might change (e.g., a new object might be added, an existing one might be deleted, or an existing one might be modified). Therefore, metadata of different backup versions 122 and 124 may be different, and in turn indexes of different backup versions 122 and 124 may be different.

Generally, in order to guarantee the reliability of the virtual machine 114, backup operations may be performed to the virtual machine 114 at predetermined time intervals. As a result, a large number of backup versions will be generated. Compared with restoring all objects in each backup version one by one and then querying in all restored objects, example implementations of the present disclosure may find the desired target object simply by querying in multiple indexes of multiple backup versions once. To further improve the query efficiency, a query may be performed to multiple backup versions of the current virtual machine 114 in parallel.

Figure 3:
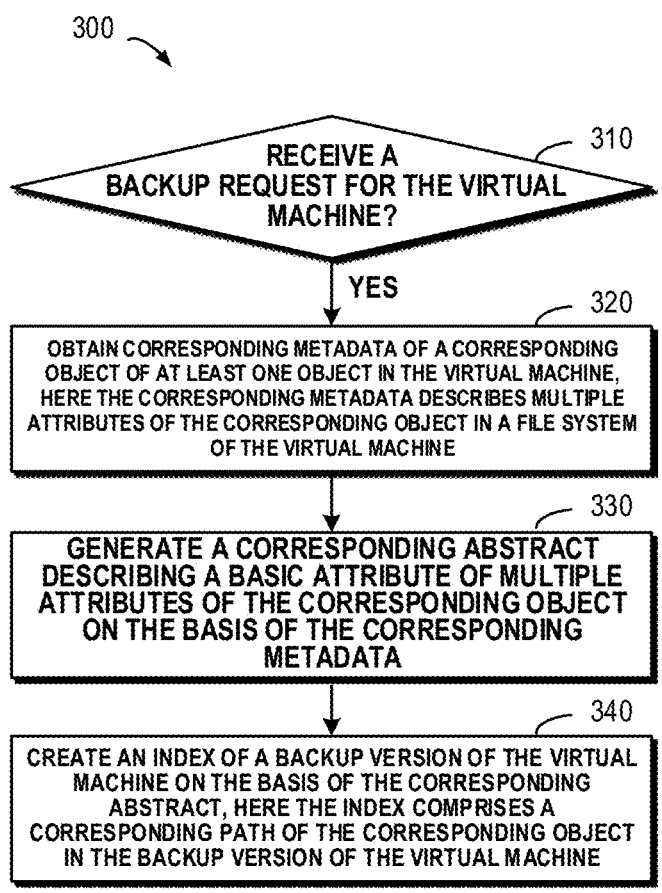
FIG. 3 schematically illustrates a flowchart of a method for managing a virtual machine according to implementations of the present disclosure.

With reference to FIG. 3, detailed description is presented to more details about the method for managing the virtual machine 114. FIG. 3 schematically shows a flowchart of a method 300 for managing a virtual machine according to implementations of the present disclosure. At block 310, it is judged whether a backup request for the virtual machine 114 is received or not. If the judgment result is "yes," then the method 300 proceeds to block 320 to trigger subsequent processing. At block 320, corresponding metadata 210 of a corresponding object of at least one object in the virtual machine 114 are obtained. It will be understood here the metadata 210 may describe multiple attributes in a file system of the virtual machine 114. The multiple attributes may be stored to a database (e.g., a SQLite database or other type of database). For example, multiple attributes of an object may be stored using a data structure below.

TABLE 1

Example Data Structure for Storing Multiple Attributes of Object

| No. | Identifier | Type | Name of Attribute | Description of Attribute |
|---|---|---|---|---|
| 1 | Mtime | Integer | modification time | Time when the object is last modified |
| 2 | Ctime | Integer | creation time | Time when the object is created |
| 3 | Isdir | Boolean | directory | Is object a directory? 0 = No, 1 = Yes |
| 4 | Size | Integer | size | Size of the object, by unit of bytes |
| 5 | Name | Text | name | Name of the object |
| 6 | SecurityID | Integer | security identifier | Security identifier of the object |
| 7 | Path | Text | path | Path of the object |
| 8 | Permission | Integer | permission | Which users are permitted to access the object, 0 = only object's creator is permitted to access; 1 = all users are permitted to access; ... |
| ... | ... | ... | | ... |

Table 1 shows the description of each field in the example data structure for storing multiple objects of an object. It will be understood names of attributes in Table 1 are merely illustrative. According to example implementations of the present disclosure, more or less attributes may be comprised. Further, those skilled in the art may further use other type of data to represent attributes. For example, modification time and creation time may be stored in the format of "hour-minute-second." Suppose there is a file test in the virtual machine, then at this point metadata of the file test may be represented as below:

Mtime=XXXXX (wherein XXXXX is an integer, which means how many 100 nanoseconds have elapsed from Jan. 1, 1601);

Ctime=YYYYY (wherein YYYYY is an integer, which means how many 100 nanoseconds have elapsed from Jan. 1, 1601);

Isdir=0 (wherein 0 means the object is not a directory);

Size=1M, (wherein 1M means the size of the object is 1M bytes);

Name=test (wherein test means the name of the object is "test");

SecurityID=00001 (wherein 00001 means the security identifier of the object is 00001);

Path=/home/test (wherein/home/test means the object is under a home file folder of the virtual machine);

Permission=0 (wherein 0 means only the creator is permitted to access the object)

. . .

According to example implementations of the present disclosure, in order to obtain metadata of each object in the virtual machine 114, first a backup operation may be performed to the virtual machine 114 to obtain the backup version 122 of the virtual machine 114. It will be understood objects in the virtual machine 114 might be modified in the running process of the virtual machine 114. To prevent an object in the virtual machine 114 from being modified when building the index 220, first the backup version 122 may be obtained, and then the corresponding metadata 210 may be obtained on the basis of a hierarchical structure of each object in the backup version 122 in the file system. In this way, even if objects in the virtual machine 114 are modified when building the index 220, since the index 220 is built on the basis of the backup version 122, at this point the index 220 is consistent with content of objects in the backup version 122. It will be understood here the hierarchical structure refers to a directory structure of the file system, and by traversing each directory in the directory structure, each object in the virtual machine 114 may be scanned one by one, and further the metadata 210 of each object may be obtained.

According to example implementations of the present disclosure, since the proxy 112 may conveniently access each virtual machine 114 in the virtual machine server 110 and may conveniently access various backup versions 122 and 124 in the backup server 120, the method 300 for managing a virtual machine according to the present disclosure may be implemented in the proxy 112. Alternatively and/or additionally, the method 300 for managing the virtual machine 114 according to the present disclosure may further be implemented at other position.

According to example implementations of the present disclosure, the backup version 122 is mounted as an external device, and the external device is scanned to obtain the hierarchical structure of the at least one object. Returning to FIG. 2, suppose a backup operation has been performed to the virtual machine 144 and the backup version 122 has been obtained, then the backup version 122 may be mounted as an external device to a device where the proxy 112 resides. Subsequently, the proxy 112 may read data in the backup version 122 of the virtual machine 114 from the external device. In this way, the metadata 210 of each object in the backup version 122 may be obtained conveniently.

According to example implementations of the present disclosure, the index 220 may be stored in association with the backup version 122. It will be understood although the index 220 is stored to the proxy 112 as shown in FIG. 2, according to further example implementations of the present disclosure, the index 220 may further be stored to other position. According to example implementations of the present disclosure, the index 220 may be stored to a dedicated storage device. Alternatively and/or additionally, the index 220 may be stored to the backup server 120. An association relation between the index 220 and the backup version 122 may be built. For example, an identifier for uniquely identifying the backup version 122 may be added at the index 220. For another example, an association table may be built to store the association relation between the index 220 and the backup version 122.

According to example implementations of the present disclosure, after the index 220 is built, an encryption operation may be performed to the backup version 122 to improve the data security. According to example implementations of the present disclosure, a compression operation may be performed to the backup version 122 to reduce the storage space of backup data.

Returning to FIG. 3, at block 330, a corresponding abstract describing a basic attribute among multiple attributes of the corresponding object may be generated on the basis of the corresponding metadata 210. More details about the abstract will be described in detail with reference to Table 2 below.

TABLE 2

Example Data Structure of Abstract of Object

| No. | Identifier | Name of Object | Description |
|-----|------------|----------------|-------------|
| 1   | Name       | name           | name of the object |
| 2   | Path       | path           | path of the object |
| ... | ...        | ...            | ...         |

According to example implementations of the present disclosure, only a basic attribute that is most relevant to index building may be extracted. For example, in one simple example implementation, only a name and path of the object may be extracted as shown in Table 2. According to other example implementations of the present disclosure, in order to include more information on the object in the index 220, the abstract shown in Table 2 may further comprise other attributes of the object. More details about the abstract will be described with reference to FIG. 4.

FIG. 4 schematically shows a block diagram for defining code 400 of an abstract according to implementations of the present disclosure. An abstract 400 may be defined on the basis of code shown in FIG. 4. Specifically, a code segment 410 defines an identifier of the object. A code segment 420 defines an identifier of the virtual machine 114 that generates the backup version 122. A code segment 430 defines the type of the backup version 122 of the object, which type may be, for example, VMWare image type of Windows, Linux VMWare image type or KVM image type. A code segment 440 defines an identifier of a server where the backup version 122 exists. A code segment 450 defines modification time of the object. A code segment 460 defines a path of the object. A code segment 470 defines the size of the object. It will be understood FIG. 4 merely illustrates an example of code defining the abstract. According to example implementations of the present disclosure, the abstract may comprise more or less content, so the code 400 may comprise more or less code segments.

Returning to FIG. 3, at block 340, the index of the backup version 122 of the virtual machine 114 may be created on the basis of the corresponding abstract. Here the index 220 may comprise a corresponding path of the corresponding object in the backup version 122 of the virtual machine 114. According to example implementations of the present disclosure, the index 220 may be created on the basis of an abstract of each object in the virtual machine 114. For example, the index 220 may be created using the currently known ElasticSearch technology, and those skilled in the art may refer to technical documents about ElasticSearch to obtain more details on how to create the index. Alternatively and/or additionally, the index 220 may be created using other index technology that is currently known or to be developed in future, which is not detailed here.

According to example implementations of the present disclosure, whether the backup version 122 associated with the index 220 comprises a target object may be determined on the basis of the created index 220. Specifically, if a query request for querying a target object is received, then an object matching with an identifier of the target object may be directly queried in the index 220. At this point, since the matching object is stored in the backup version 122, the object may be referred to as a "backup object." For example, suppose it is desirable to query an object with a name of "test," at this point a lookup may be performed in the index with a keyword of "test."

According to example implementations of the present disclosure, a permission condition may be set for the backup version 122, here the permission condition indicating which users are permitted to access the backup version 122. When performing a query, first a permission condition of the backup version 122 may be obtained, and the permission condition may be compared with access right of a query requester initiating the query request. If the access right of the query requester matches with the permission condition, then a backup object matching with the object is queried in the index 220.

Continuing the above example, if the permission condition indicates only a specific requester in a permission list is permitted to access the backup version 122, then at this point it is first judged whether the query requester is in the permission list. If the judgment result is "yes," then a search is conducted in the index 220 with a keyword of "test." If the judgment result is "no," then the query requester may be prompted: the query request is rejected. It will be understood illustrated above is merely an example of the permission condition. According to example implementations of the present disclosure, other permission condition may also be used. For example, a security level may be set for users, and the permission condition may define: users with the specific security level are permitted to access the backup version 122.

According to example implementations of the present disclosure, when it is determined the backup version 122 comprises the backup version of the object matching with the query request, an identifier of the backup version and a position of the backup object in the backup version may be presented. For example, if the index 220 shows the file "test" is under the directory "/home/test" of the backup version 122, content may be displayed to the query request as below:

The file test is found at the position "/home/test" in the backup version 122.

According to example implementations of the present disclosure, the index 220 may further comprise more attributes of the backup version 122. The attributes may comprise at least one of: a backup requester of the backup request for generating the backup version 122, generation time of the backup version 122, the type of the backup version 122, the size of the backup version 122, storage position of the backup version 122, and an identifier of the virtual machine 114. According to example implementations of the present disclosure, attributes of the backup version 122 may be presented so that the user 142 may know various information of the backup version 122 and further determine whether an object comprised in the backup version 122 is the desired object.

According to example implementations of the present disclosure, the index 220 further comprises attributes of the backup object. The attributes of the backup object may comprise at least one of: the size of the backup object, an author of the backup object, the type of the backup object, creation time of the backup object, access time of the backup object, and modification time of the backup object. According to example implementations of the present disclosure, attributes of the backup object may be presented so that the user 142 may know various information of the backup object and further determine whether the backup object is the desired object. More details on querying a target object in the backup version will be described with reference to FIG. 5 below.

Figure 5:
FIG. 5 schematically illustrates a block diagram of a page for querying a target object according to implementations of the present disclosure.

FIG. 5 schematically shows a block diagram of a page 500 of querying a target object according to implementations of the present disclosure. As depicted, suppose the query request defines objects with a name including "test" are to be queried in the backup version 122. With the above method, a page 500 as shown in FIG. 5 may be returned. The page 500 displays two files with the name including "test" are found in the backup version 122.

Description is presented below by taking the first file "test.com" as an example. As shown by a reference numeral 510, "source" represents an identifier of the backup server 122 where the backup version 122 exists; as shown by a reference numeral 520, "client" represents an identifier of the client 140 associated with the virtual machine 114. Other attributes are further shown in FIG. 5, for example, "size" represents the size of the file, "LastModified" represents the time when the file is last modified, "Platform" represents the name of a platform on which the file is based, "Plugin" represents the type of the backup version, and "Backup target" represents the name of an image of the virtual machine 114 from which the file comes. It will be understood FIG. 5 merely illustrates an example of the page comprising the query result. According to example implementations of the present disclosure, the page of the query result may comprise more or less information.

According to example implementations of the present disclosure, the user 142 may select a backup object in the page as shown in FIG. 5. Subsequently, the corresponding object in the virtual machine 114 may be restored on the basis of the found backup object. For example, suppose the virtual machine 114 already comprises the file "test.com." At this point, if the user 142 selects the backup object "test.com" in the backup version 122 as shown in FIG. 5, then an existing file in the virtual machine 114 may be replaced on the basis of the selected backup object "test.com."

According to example implementations of the present disclosure, besides querying in the backup version 122 of the virtual machine 114, an object matching with the identifier may further be queried in the virtual machine. Here, since a matching object exists in the virtual machine 114 and the user 142 may access directly at the local client 140, the object may be referred to as a local object. If a matching local object is found, multiple attributes of the local object in the file system of the virtual machine 114 may be presented. Here the multiple attributes may comprise any of the following attributes of the found local object: the size of the local object, an author of the local object, the type of the local object, creation time of the local object, access time of the local object, and modification time of the local object. According to example implementations of the present disclosure, attributes of the local object may be presented so that the user 142 may know various information of the local object and further determine whether the local object is the desired object. More details on querying a target object in the virtual machine 114 will be described with reference to FIG. 6 below.

Figure 6:
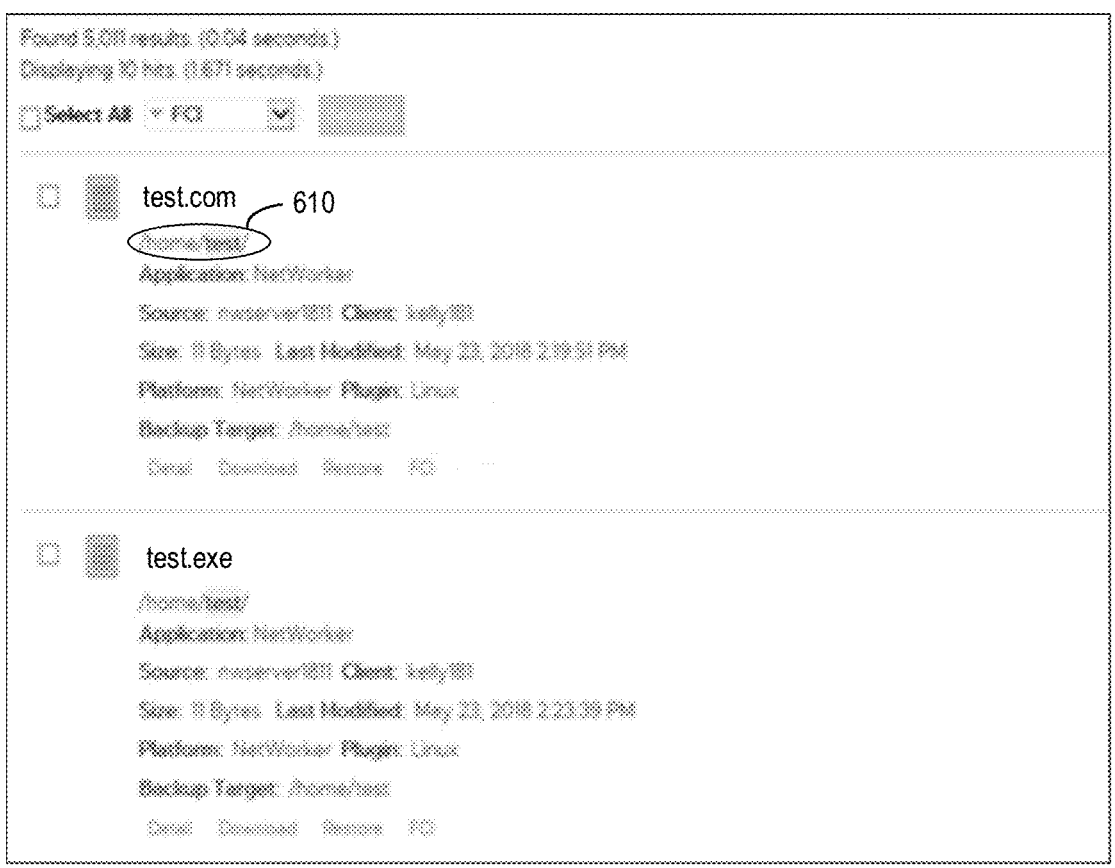
FIG. 6 schematically illustrates a block diagram of a page for querying a target object according to implementations of the present disclosure.

FIG. 6 schematically shows a block diagram of a page 600 of querying a target object according to implementations of the present disclosure. The page 600 shown in FIG. 6 is similar to the page 500 shown in FIG. 5, and the difference is that the two files "test.com" and "test.exe" are files in the virtual machine 114 rather than in the historical backup version 122 of the virtual machine 114. As shown in FIG. 6, a reference numeral 610 shows a path of the file "test.com" in the virtual machine 114. Further, the page 600 may further comprise other attributes of the file as found in the virtual machine 114. Those skilled in the art may refer to the description of FIG. 5, which is not detailed herein. It will be understood FIG. 6 merely illustrates an example of the page comprising the query result. According to example implementations of the present disclosure, the page of the query result may comprise more or less information.

While examples of the method according to the present disclosure have been described in detail with reference to FIGS. 2 to 6, description is presented below to the implementation of a corresponding apparatus. According to example implementations of the present disclosure, provided is an apparatus for managing a virtual machine. The apparatus comprises: an obtaining module configured to, in response to receiving a backup request for the virtual machine, obtain corresponding metadata of a corresponding object of at least one object in the virtual machine, the corresponding metadata describing multiple attributes of the corresponding object in a file system of the virtual machine; a generating module configured to generate a corresponding abstract describing a basic attribute of multiple attributes of the corresponding object on the basis of the corresponding metadata; and a creating module configured to create an index of a backup version of the virtual machine on the basis of the corresponding abstract, the index comprising a corresponding path of the corresponding object in the backup version of the virtual machine.

According to example implementations of the present disclosure, the obtaining module is further configured to: perform a backup operation to the virtual machine so as to obtain the backup version of the virtual machine; and obtain the corresponding metadata on the basis of a hierarchical structure of the at least one object in the backup version in the file system.

According to example implementations of the present disclosure, the obtaining module is further configured to: mount the backup version as an external device; and scan the external device to obtain the hierarchical structure of the at least one object.

According to example implementations of the present disclosure, the apparatus further comprises a query module configured to, in response to receiving a query request for querying a target object, query in the index a backup object matching with an identifier of the target object.

According to example implementations of the present disclosure, the query module is further configured to: obtain a permission condition of the backup version; and query in the index a backup object matching with the identifier in response to access right of a query requester of the query request matching with the permission condition.

According to example implementations of the present disclosure, the apparatus further comprises a presenting module configured to present an identifier of the backup version and a position of the backup object in the backup version.

According to example implementations of the present disclosure, the apparatus further comprises a restoration module configured to restore the backup version to the virtual machine in response to the backup version being selected.

According to example implementations of the present disclosure, the index further comprises attributes of the backup version.

According to example implementations of the present disclosure, the presenting module is further configured to present attributes of the backup version.

According to example implementations of the present disclosure, the attributes of the backup version comprise at least one of: a backup requester of the backup request for generating the backup version, generation time of the backup version, the type of the backup version, the size of the backup version, a storage position of the backup version, and an identifier of the virtual machine.

According to example implementations of the present disclosure, the index further comprises attributes of the backup object.

According to example implementations of the present disclosure, the presenting module is further configured to present attributes of the backup object.

According to example implementations of the present disclosure, the attributes of the backup object comprise at least one of: the size of the backup object, an author of the backup object, the type of the backup object, creation time of the backup object, access time of the backup object, and modification time of the backup object.

According to example implementations of the present disclosure, the query module is further configured to: query in the virtual machine a local object matching with the identifier; and present multiple attributes of the local object in the file system of the virtual machine.

Figure 7:
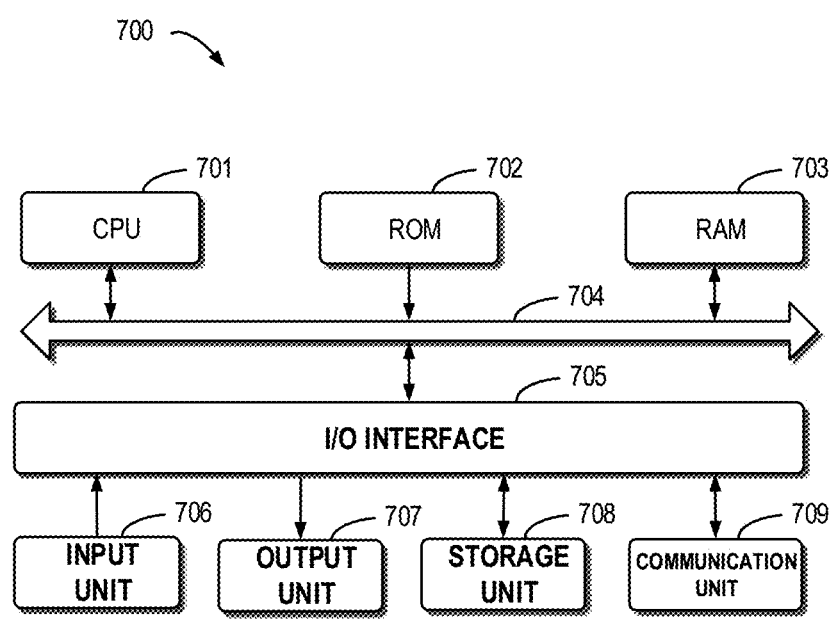
FIG. 7 schematically illustrates a block diagram of an apparatus for managing a virtual machine according to example implementations of the present disclosure.

FIG. 7 schematically shows a block diagram of an apparatus 700 for managing a storage system according to example implementations of the present disclosure. As depicted, the apparatus 700 includes a central process unit (CPU) 701, which can execute various suitable actions and processing based on the computer program instructions stored in the read-only memory (ROM) 702 or computer program instructions loaded in the random-access memory (RAM) 703 from a storage unit 708. The RAM 703 can also store all kinds of programs and data required by the operations of the apparatus 700. CPU 701, ROM 702 and RAM 703 are connected to each other via a bus 704. The input/output (I/O) interface 705 is also connected to the bus 704.

A plurality of components in the apparatus 700 is connected to the I/O interface 705, including: an input unit 706, such as keyboard, mouse and the like; an output unit 707, e.g., various kinds of display and loudspeakers etc.; a storage unit 708, such as magnetic disk and optical disk etc.; and a communication unit 709, such as network card, modem, wireless transceiver and the like. The communication unit 709 allows the apparatus 700 to exchange information/data with other devices via the computer network, such as Internet, and/or various telecommunication networks.

The above described each process and treatment, such as the method 300, can also be executed by the processing unit 701. For example, in some implementations, the method 300 can be implemented as a computer software program tangibly included in the machine-readable medium, e.g., the storage unit 708. In some implementations, the computer program can be partially or fully loaded and/or mounted to the apparatus 700 via ROM 702 and/or the communication unit 709. When the computer program is loaded to the RAM 703 and executed by the CPU 701, one or more steps of the above described method 300 can be implemented. Alternatively, in other implementations, the CPU 701 also can be configured in other suitable manners to realize the above procedure/method.

According to example implementations of the present disclosure, there is provided an apparatus for managing a virtual machine, comprising: at least one processor; a volatile memory; and a memory coupled to the at least one processor, the memory having instructions stored thereon, the instructions, when executed by the at least one processor, causing the apparatus to perform acts. The acts include: in response to receiving a backup request for the virtual machine, obtaining corresponding metadata of a corresponding object of at least one object in the virtual machine, the corresponding metadata describing multiple attributes of the corresponding object in a file system of the virtual machine; generating a corresponding abstract describing a basic attribute of multiple attributes of the corresponding object on the basis of the corresponding metadata; and creating an index of a backup version of the virtual machine on the basis of the corresponding abstract, the index comprising a corresponding path of the corresponding object in the backup version of the virtual machine.

According to example implementations of the present disclosure, obtaining corresponding metadata of a corresponding object of at least one object in the virtual machine comprises: performing a backup operation to the virtual machine so as to obtain the backup version of the virtual machine; and obtaining the corresponding metadata on the basis of a hierarchical structure of the at least one object in the backup version in the file system.

According to example implementations of the present disclosure, the acts further comprise: mounting the backup version as an external device; and scanning the external device to obtain the hierarchical structure of the at least one object.

According to example implementations of the present disclosure, the acts further comprise: in response to receiving a query request for querying a target object, querying in the index a backup object matching with an identifier of the target object.

According to example implementations of the present disclosure, querying in the index a backup object matching with the identifier comprises: obtaining a permission condition of the backup version; and querying in the index a backup object matching with the identifier in response to access right of a query requester of the query request matching with the permission condition.

According to example implementations of the present disclosure, the acts further comprise: presenting an identifier of the backup version and a position of the backup object in the backup version.

According to example implementations of the present disclosure, the acts further comprise: restoring the backup version to the virtual machine in response to the backup version being selected.

According to example implementations of the present disclosure, the index further comprises attributes of the backup version.

According to example implementations of the present disclosure, the acts further comprise: presenting attributes of the backup version.

According to example implementations of the present disclosure, the attributes of the backup version comprise at least one of: a backup requester of the backup request for generating the backup version, generation time of the backup version, the type of the backup version, the size of the backup version, a storage position of the backup version, and an identifier of the virtual machine.

According to example implementations of the present disclosure, the index further comprises attributes of the backup object.

According to example implementations of the present disclosure, the acts further comprise: presenting attributes of the backup object.

According to example implementations of the present disclosure, the attributes of the backup object comprise at least one of: the size of the backup object, an author of the backup object, the type of the backup object, creation time of the backup object, access time of the backup object, and modification time of the backup object.

According to example implementations of the present disclosure, the acts further comprise: querying in the virtual machine a local object matching with the identifier; and presenting multiple attributes of the local object in the file system of the virtual machine.

According to example implementations of the present disclosure, there is provided a computer program product. The computer program product is tangibly stored on a non-transient computer readable medium and comprises machine executable instructions which are used to implement the method according to the present disclosure.

According to example implementations of the present disclosure, there is provided a computer readable medium. The computer readable medium has machine executable instructions stored thereon, the machine executable instructions, when executed by at least one processor, causing the at least one processor to implement the method according to the present disclosure.

The present disclosure can be method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to implementations of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable other ordinary skilled in the art to understand implementations of the present disclosure.

We claim:

1. A method for managing a backup of a virtual machine by a backup proxy, the method comprising:
   in response to receiving a backup request at the backup proxy for the virtual machine, performing a backup operation so as to obtain a backup version of the virtual machine on a backup server;
   thereafter mounting the backup version as an external device to the backup proxy;
   obtaining corresponding metadata of a corresponding object of at least one object in the backup version of the virtual machine, the corresponding metadata describing multiple attributes of the corresponding object in a file system of the virtual machine;
   generating a corresponding abstract describing a basic attribute of multiple attributes of the corresponding object based on the corresponding metadata; and
   creating an index of the backup version of the virtual machine based on the corresponding abstract, the index comprising a corresponding path of the corresponding object in the backup version of the virtual machine.

2. The method of claim 1, wherein obtaining corresponding metadata of a corresponding object of at least one object in the virtual machine comprises:
   obtaining the corresponding metadata based on a hierarchical structure of the at least one object in the backup version in the file system.

3. The method of claim 2, further comprising:
   scanning the external device to obtain the hierarchical structure of the at least one object.

4. The method of claim 3, further comprising:
   in response to receiving a query request for querying a target object, querying in the index a backup object matching with an identifier of the target object.

5. The method of claim 4, wherein querying in the index a backup object matching with the identifier comprises:
   obtaining a permission condition of the backup version; and
   querying in the index a backup object matching with the identifier in response to access right of a query requester of the query request matching with the permission condition.

6. The method of claim 5, further comprising:
   presenting an identifier of the backup version and a position of the backup object in the backup version.

7. The method of claim 6, further comprising:
   restoring the backup version to the virtual machine in response to the backup version being selected.

8. The method of claim 6, wherein the index further comprises attributes of the backup version, the method further comprising: presenting attributes of the backup version, the attributes of the backup version comprising at least one of:
   a backup requester of the backup request for generating the backup version;
   generation time of the backup version;
   a type of the backup version;
   a size of the backup version;
   a storage position of the backup version; or
   an identifier of the virtual machine.

9. The method of claim 6, wherein the index further comprises attributes of the backup object, the method further comprising: presenting attributes of the backup object, the attributes of the backup object comprising at least one of:
   a size of the backup object;
   an author of the backup object;
   a type of the backup object;
   creation time of the backup object;
   access time of the backup object; or
   modification time of the backup object.

10. The method of claim 4, further comprising:
    querying in the virtual machine a local object matching with the identifier; and
    presenting multiple attributes of the local object in the file system of the virtual machine.

11. An apparatus for managing a virtual machine using a backup proxy, the apparatus comprising:
    at least one processor; and
    a memory coupled to the at least one processor and having instructions stored thereon, the instructions, when executed by the at least one processor, causing the at least one processor to perform operations, the operations comprising:
    in response to receiving a backup request for the virtual machine, performing a backup operation so as to obtain a backup version of the virtual machine on a backup server;
    thereafter mounting the backup version as an external device to the backup proxy;
    obtaining corresponding metadata of a corresponding object of at least one object in the backup version of the virtual machine, the corresponding metadata describing multiple attributes of the corresponding object in a file system of the virtual machine;
    generating a corresponding abstract describing a basic attribute of multiple attributes of the corresponding object based on the corresponding metadata; and creating an index of the backup version of the virtual machine based on the corresponding abstract, the index comprising a corresponding path of the corresponding object in the backup version of the virtual machine.

12. The apparatus of claim 11, wherein obtaining corresponding metadata of a corresponding object of at least one object in the virtual machine comprises:
obtaining the corresponding metadata based on a hierarchical structure of the at least one object in the backup version in the file system.

13. The apparatus of claim 12, wherein the operations further comprise:
scanning the external device to obtain the hierarchical structure of the at least one object.

14. The apparatus of claim 13, wherein the operations further comprise:
in response to receiving a query request for querying a target object, querying in the index a backup object matching with an identifier of the target object.

15. The apparatus of claim 14, wherein querying in the index a backup object matching with the identifier comprises:
obtaining a permission condition of the backup version; and
querying in the index a backup object matching with the identifier in response to access right of a query requester of the query request matching with the permission condition.

16. The apparatus of claim 15, wherein the operations further comprise:
presenting an identifier of the backup version and a position of the backup object in the backup version.

17. The apparatus of claim 16, wherein the operations further comprise:
restoring the backup version to the virtual machine in response to the backup version being selected.

18. The apparatus of claim 16, wherein the index further comprises attributes of the backup version, the method further comprising: presenting attributes of the backup version, the attributes of the backup version comprising at least one of:
a backup requester of the backup request for generating the backup version;
generation time of the backup version;
a type of the backup version;
a size of the backup version;
a storage position of the backup version; or
an identifier of the virtual machine.

19. The apparatus of claim 16, wherein the index further comprises attributes of the backup object, the method further comprising: presenting attributes of the backup object, the attributes of the backup object comprising at least one of:
a size of the backup object;
an author of the backup object;
a type of the backup object;
creation time of the backup object;
access time of the backup object; or
modification time of the backup object.

20. The apparatus of claim 14, wherein the operations further comprise:
querying in the virtual machine a local object matching with the identifier; and
presenting multiple attributes of the local object in the file system of the virtual machine.

21. A non-transitory machine-readable medium having instructions stored therein, which when executed by a processor, cause the processor to perform operations, the operations comprising:
in response to receiving a backup request for the virtual machine, performing a backup operation so as to obtain a backup version of the virtual machine on a backup server;
thereafter mounting a backup version as an external device to a backup proxy;
obtaining corresponding metadata of a corresponding object of at least one object in the backup version of the virtual machine, the corresponding metadata describing multiple attributes of the corresponding object in a file system of the virtual machine;
generating a corresponding abstract describing a basic attribute of multiple attributes of the corresponding object based on the corresponding metadata; and
creating an index of the backup version of the virtual machine based on the corresponding abstract, the index comprising a corresponding path of the corresponding object in the backup version of the virtual machine.

* * * * *